C. H. TAYLOR.
UNIVERSAL JOINT.
APPLICATION FILED JULY 22, 1916.

1,253,108.

Patented Jan. 8, 1918.
2 SHEETS—SHEET 1.

INVENTOR
Cecil Hamelin Taylor
BY Ralzemond A. Parker
ATTORNEY

C. H. TAYLOR.
UNIVERSAL JOINT.
APPLICATION FILED JULY 22, 1916.

1,253,108.

Patented Jan. 8, 1918.
2 SHEETS—SHEET 2.

INVENTOR
Cecil Hamelin Taylor
BY Ralzemond A. Parker
ATTORNEY

UNITED STATES PATENT OFFICE.

CECIL HAMELIN TAYLOR, OF ALMA, MICHIGAN.

UNIVERSAL JOINT.

1,253,108.  Specification of Letters Patent.  Patented Jan. 8, 1918.

Application filed July 22, 1916. Serial No. 110,751.

*To all whom it may concern:*

Be it known that I, CECIL HAMELIN TAYLOR, a citizen of the United States, residing at Alma, county of Gratiot, State of Michigan, have invented a certain new and useful Improvement in Universal Joints, and declare the following to be a full, clear, and exact description of the same, such as will enable others skilled in the art to which it pertains to make and use the same, reference being had to the accompanying drawings, which form a part of this specification.

My invention relates to universal joints and the object of my improvements is to provide an improved universal joint in which the main relatively moving contiguous surfaces are inclosed and protected. I accomplish this object in the device illustrated in the accompanying drawings, in which—

Figure 1:
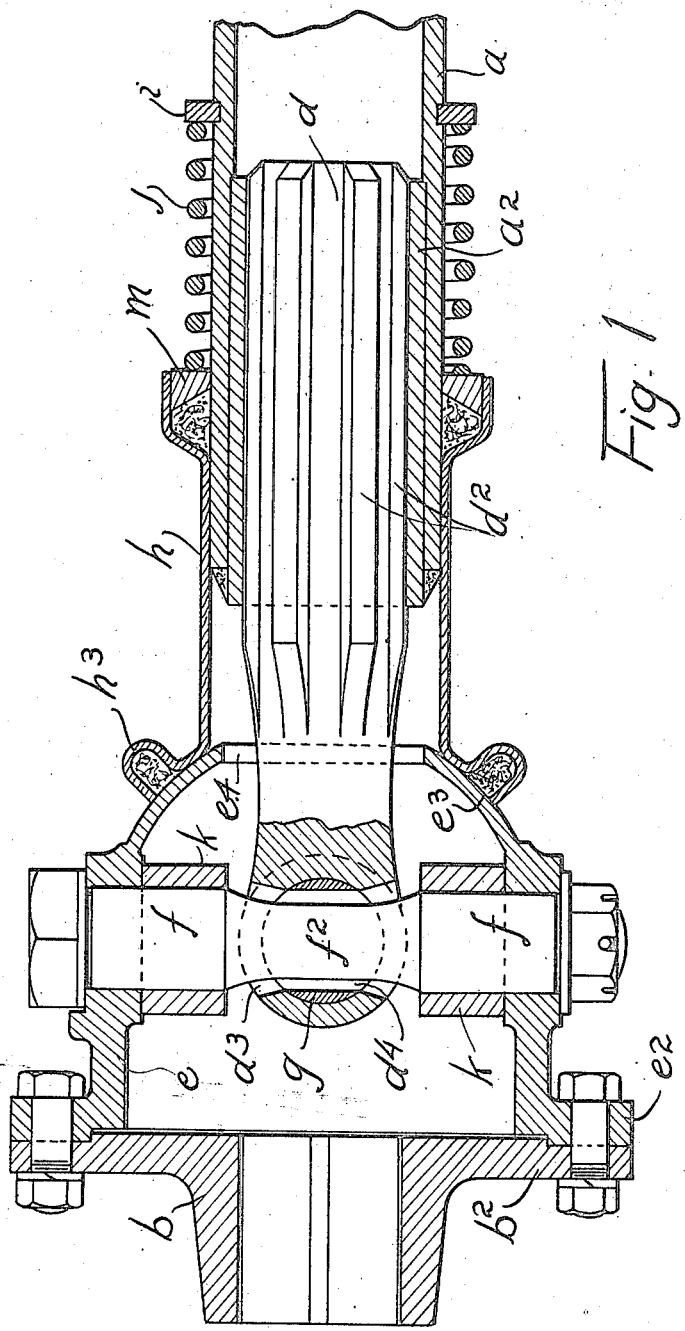
Figure 1 is a section of a universal joint embodying my invention with adjacent portions of the transmission mechanism.
Figure 2:
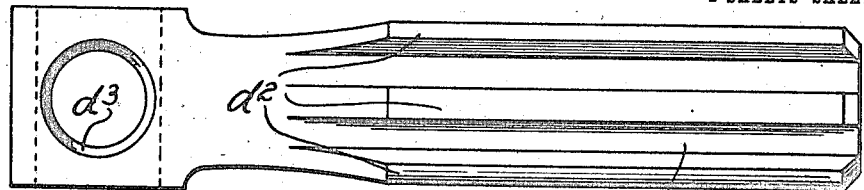
Fig. 2 is an elevation of the shaft-front.
Figure 3:
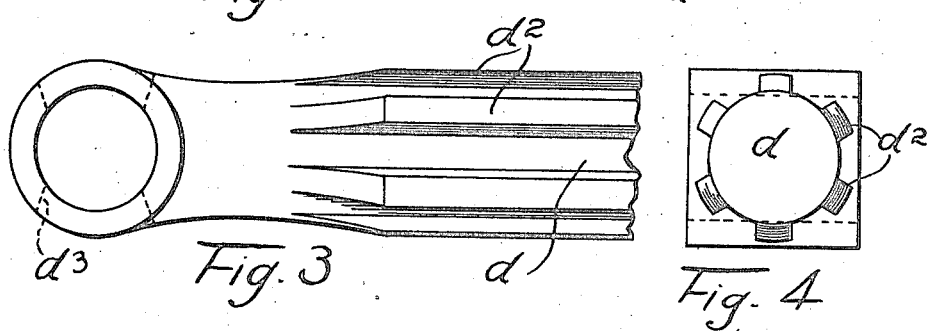
Fig. 3 is a plan view of the part shown in Fig. 2.
Figure 4:
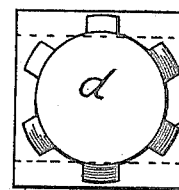
Fig. 4 is an end view of the same looking from the right of said figure.
Figures 5, 6:
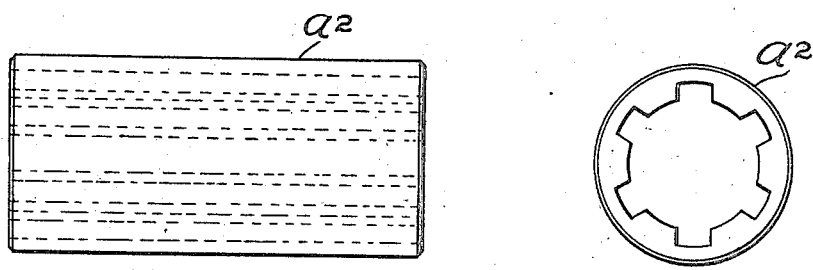
Fig. 5 is a side elevation of the splined sleeve of the propeller shaft.
Fig. 6 is an end view of said sleeve.
Figures 7, 8:
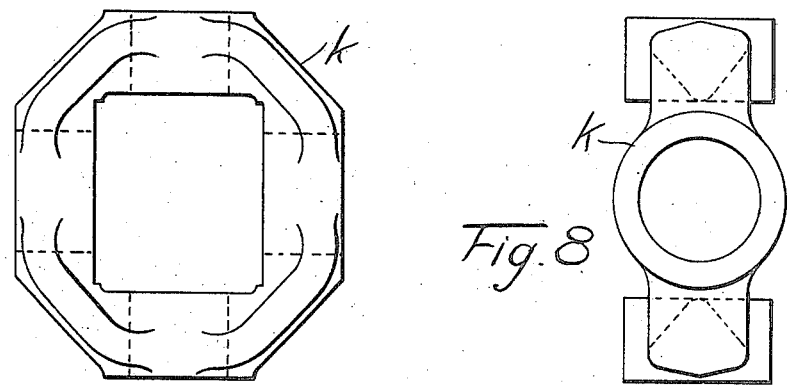
Fig. 7 is a front elevation of the spider.
Fig. 8 is a side view of the same.

$a$ is a transmission shaft and $a^2$ is a sleeve provided with internal longitudinal grooves and splines. The sleeve $a^2$ is welded into the end of the propeller shaft $a$. $b$ is a plate adapted to be fixed to the shaft from, or to, which motion is communicated. $b^2$ is the attaching flange of the plate $b$. $e$ is a housing approximately cylindrical for the greater part of its surface and having an outwardly extending flange $e^2$ at one end adapted to be secured to the flange $b^2$ of the plate $b$. The other end of the housing $e$ is made sphero-segmental in shape as shown at $e^3$ and has an opening $e^4$ coaxial with the shaft $a$. $d$ is a stub shaft provided for a greater portion of its length with longitudinal splines $d^2$ adapted to fit and reciprocate in the grooves of the sleeve $a^2$. The stub-shaft $d$ is provided at one end with apertures $d^3$ and $d^4$ having their axes at right angles to each other and intersecting. $k$ is a spider adapted to fit into the housing $e$. $f$ is a pin reduced in size at its central portion $f^2$ and fitting in apertures in the housing $e$ and secured therein by a nut or nuts in the usual way. The spider $k$ is pivoted on the cylindrical end portions of the pin $f$. $g$ is a pin having an aperture transversely through it engaging in the aperture $d^4$ in the shaft-front $d$ and at its ends engaging in the spider $k$. The axes of the pins $f$ and $g$ intersect and are at right angles to each other. $h$ is a sleeve fitting and adapted to slide upon the outer surface of the shaft $a$. $i$ is a ring secured around the shaft $a$ and forming an annular flange. The sleeve $h$ is expanded at one end to admit of a packing material and a packing ring $m$, thus forming a gland around the shaft $a$. $j$ is a compression spring bearing at one end against the flange $i$ and at the other end against the packing ring $m$. The other end of the sleeve $h$ is expanded and shaped to the surface $e^3$. This is also shaped to form an annular groove $h^3$ which shall contain packing material to form a close joint between the surface $e^3$ of the housing $e$ and this end of the sleeve $h$.

The portion $f^2$ of the pin $f$ passes through the transverse aperture in the pin $g$.

What I claim is:

1. The combination of a tubular shaft, a sleeve in said shaft having longitudinal grooves in its inner surface, a shaft end having splines extending outward from its outer surface adapted to fit into the grooves of said sleeve and permit longitudinal motion of said engaging parts, a universal joint mechanism, said shaft end being connected to said mechanism, and a housing inclosing said mechanism and the joint between said shaft end and the sleeve.

2. The combination of a tubular shaft, a sleeve fixed therein having a plurality of longitudinal grooves in its inner surface, a shaft end having a plurality of splines extending from its outer surface adapted to engage in said grooves permitting a longitudinal movement of said engaging parts, and a universal joint mechanism forming a transmission mechanism leading from said shaft end.

In testimony whereof, I sign this specification.

CECIL HAMELIN TAYLOR.